Feb. 27, 1934.    J. W. LYNCH ET AL    1,948,928
GLASS BLOWING MACHINE
Original Filed June 4, 1917   7 Sheets-Sheet 5
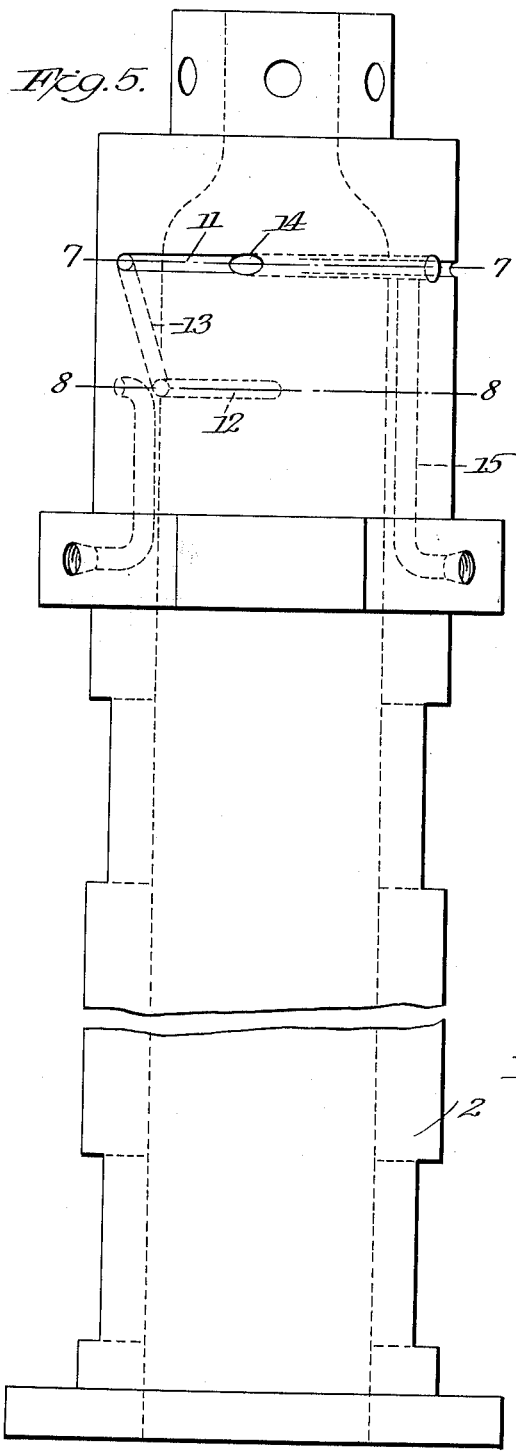
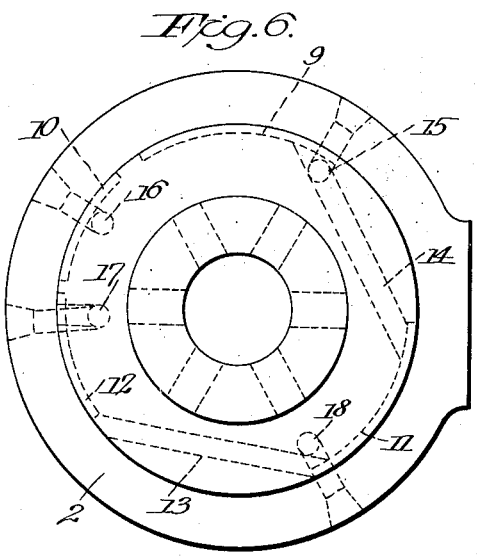
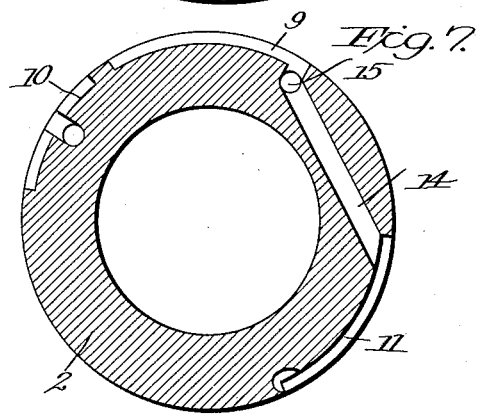
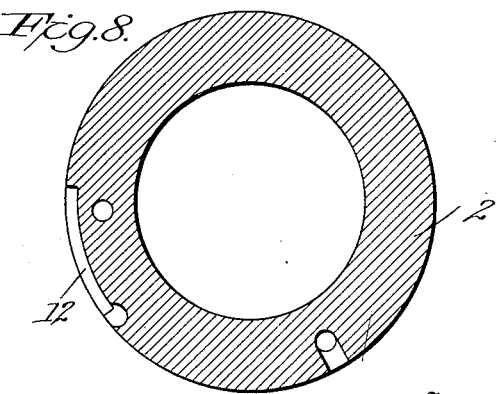
Inventors
James W. Lynch
Edward G. Bridges
By Emery, Booth, Varney & Holcombe
Attorneys Feb. 27, 1934.  J. W. LYNCH ET AL  1,948,928
GLASS BLOWING MACHINE
Original Filed June 4, 1917    7 Sheets-Sheet 6
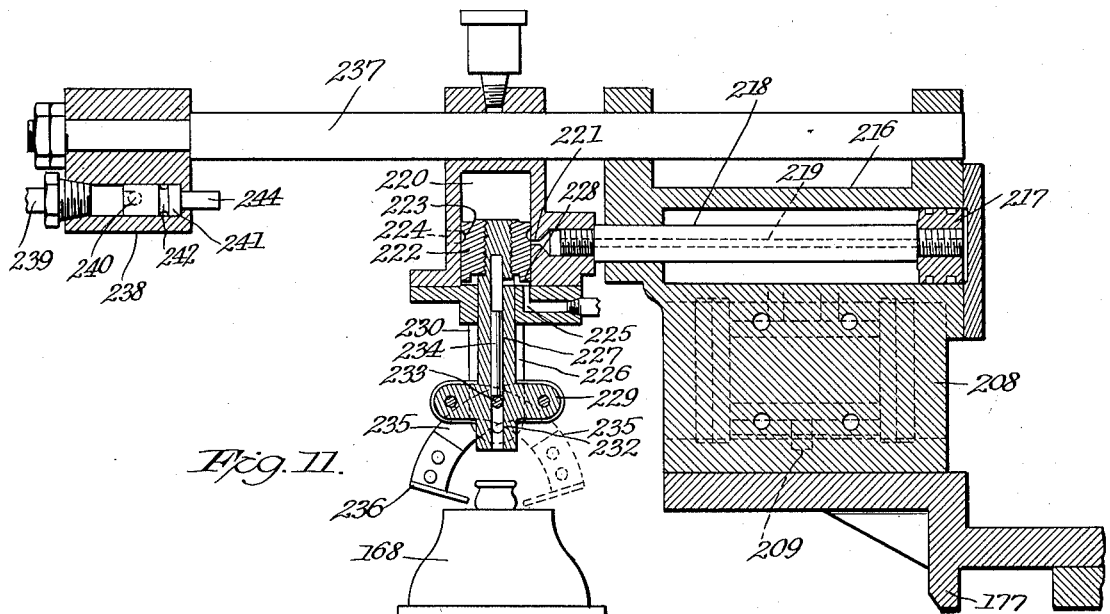
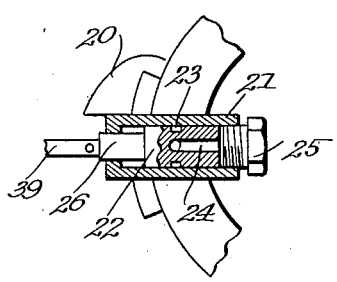
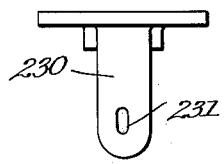
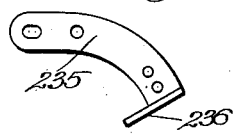
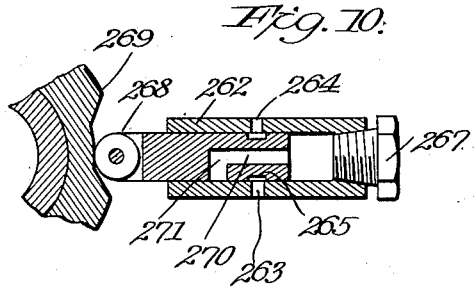
Inventors
James W. Lynch,
Edward G. Bridges,
By Emery, Booth, Varney & Holcombe
Attorneys

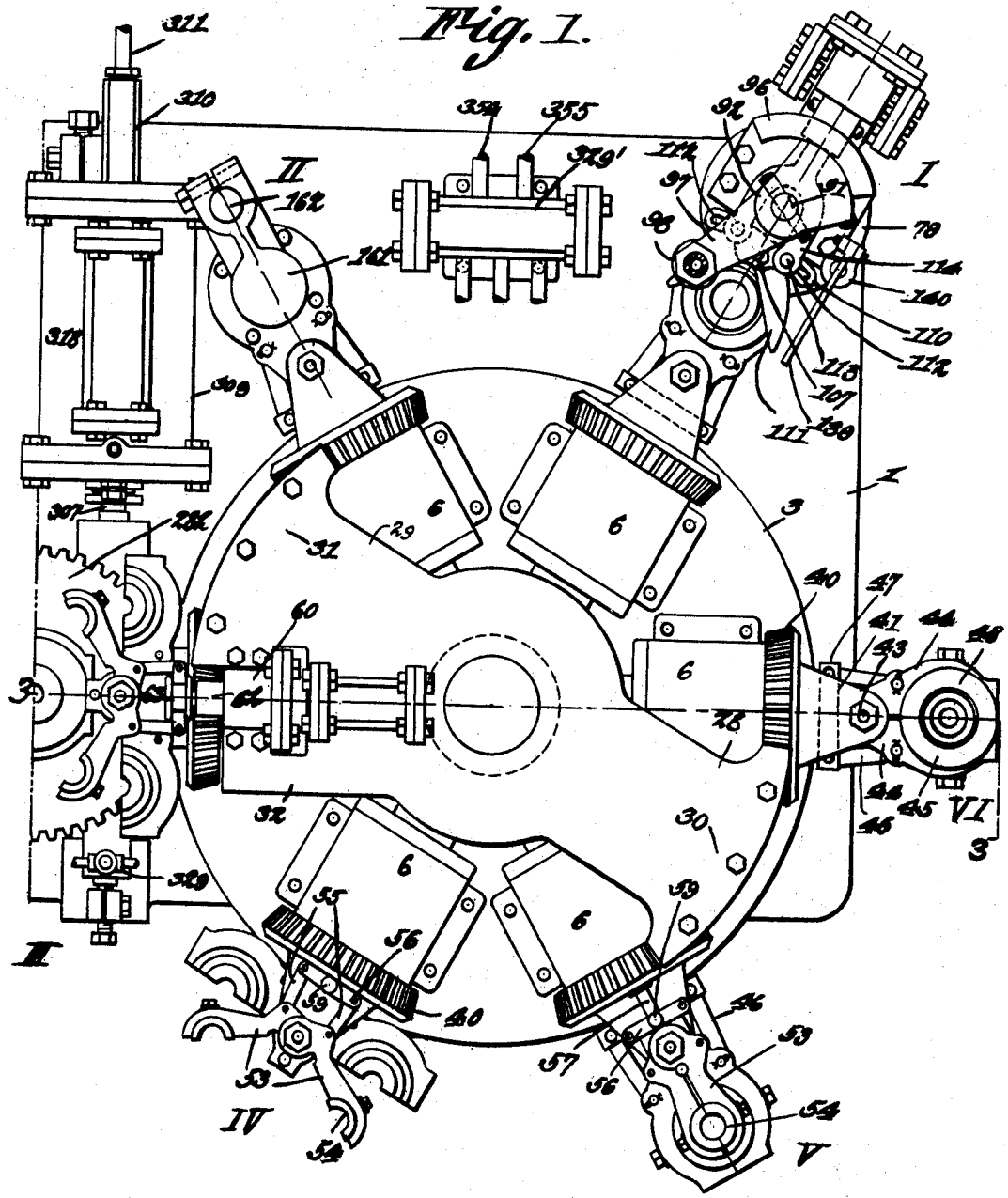

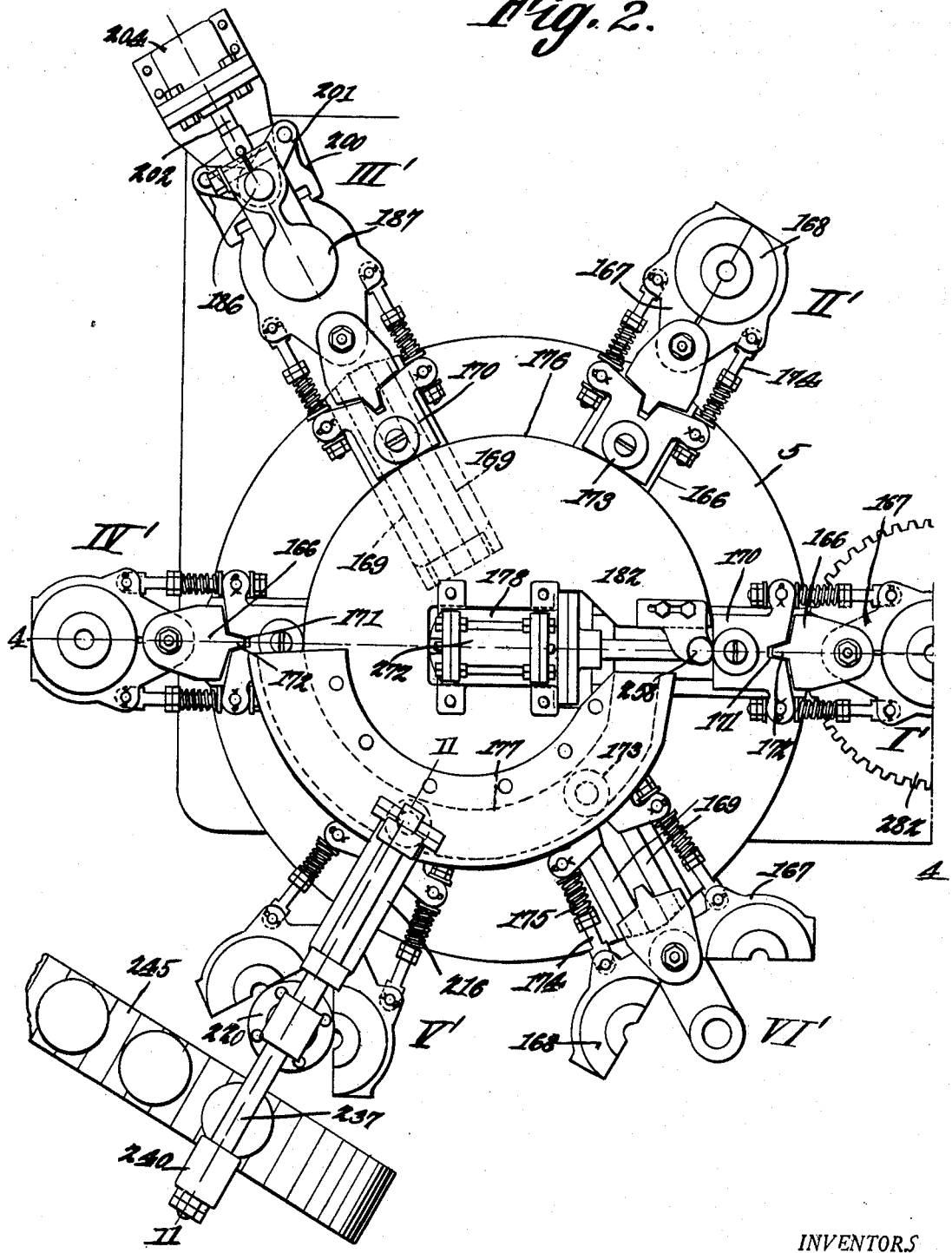

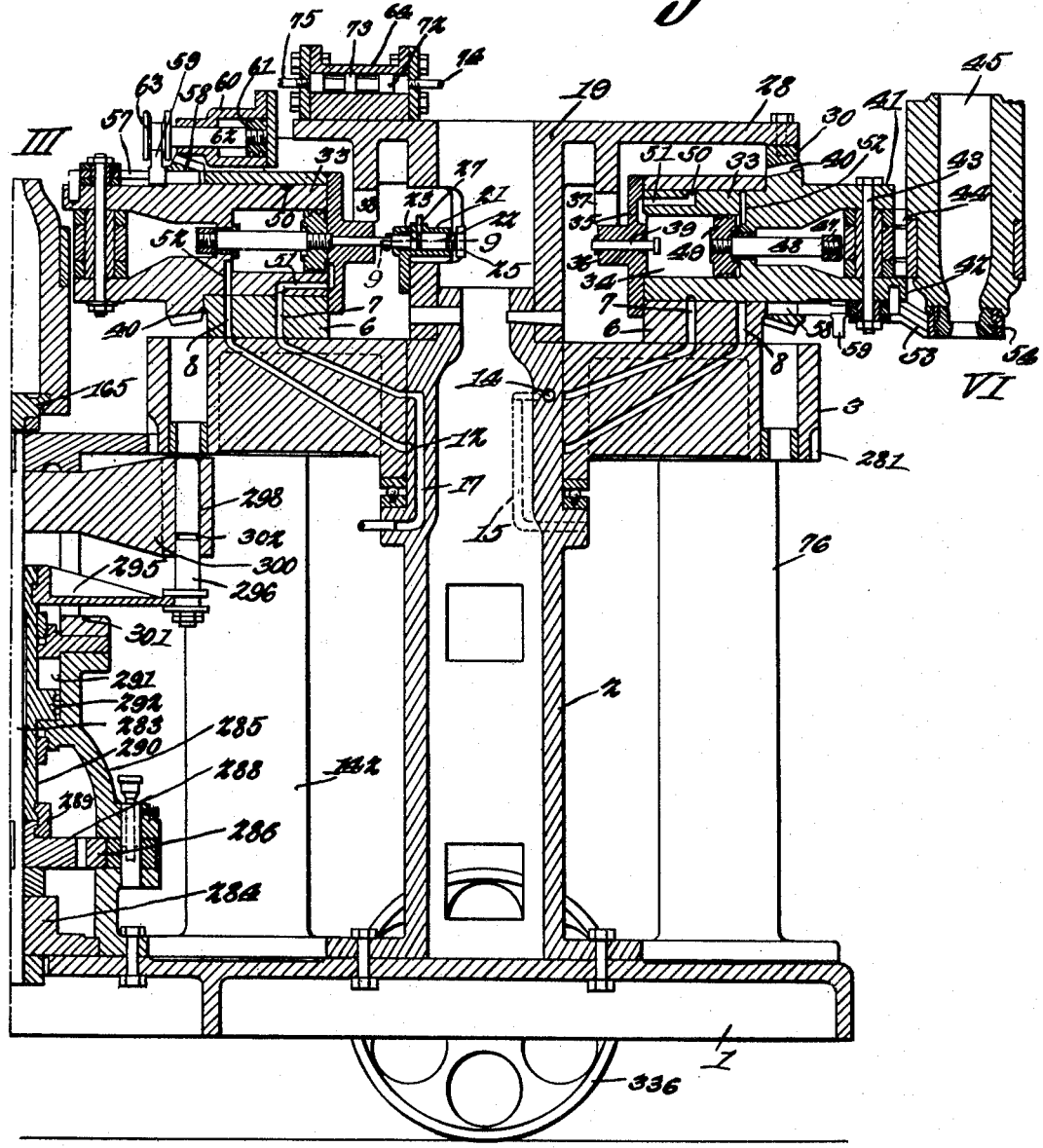

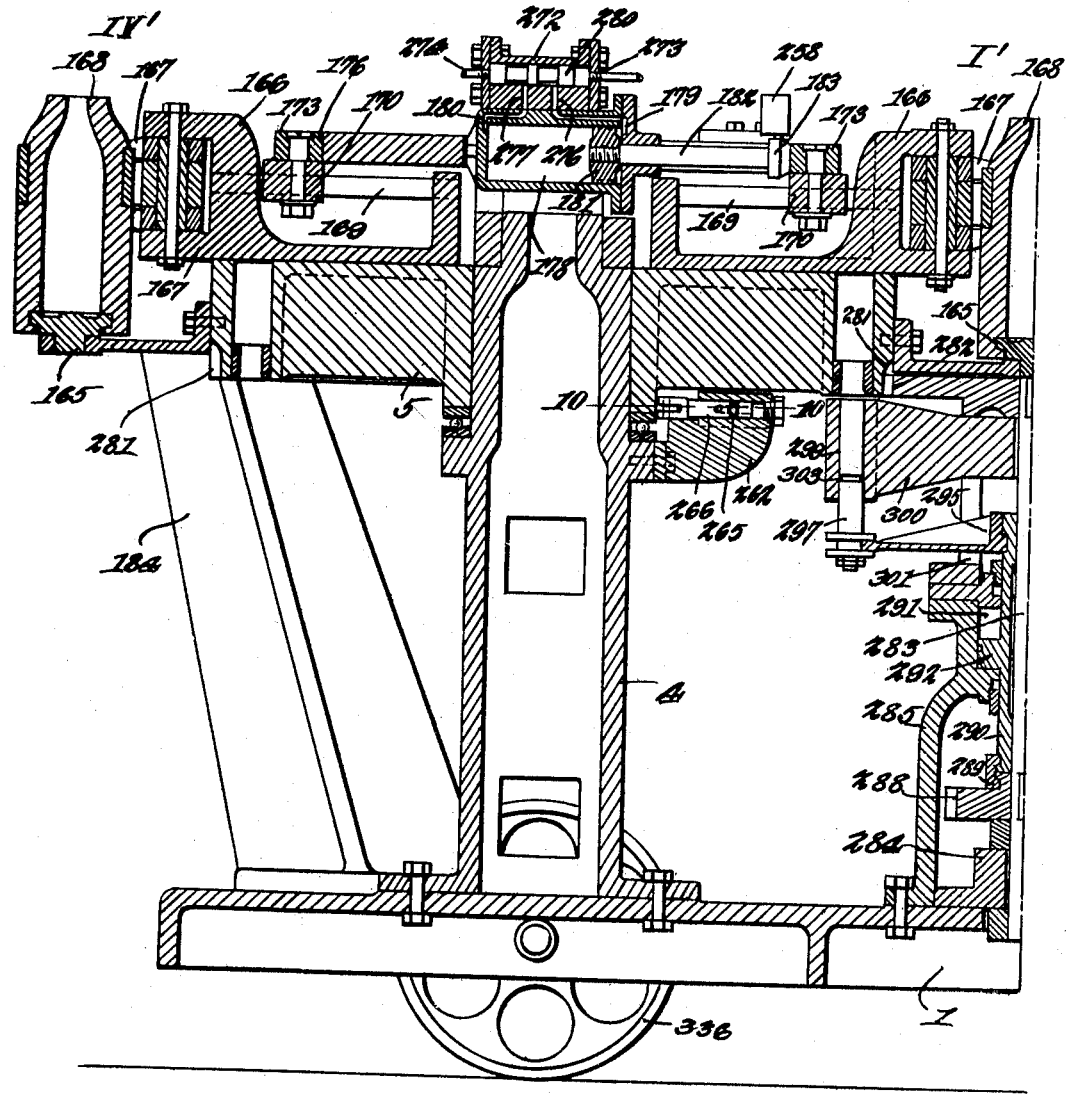

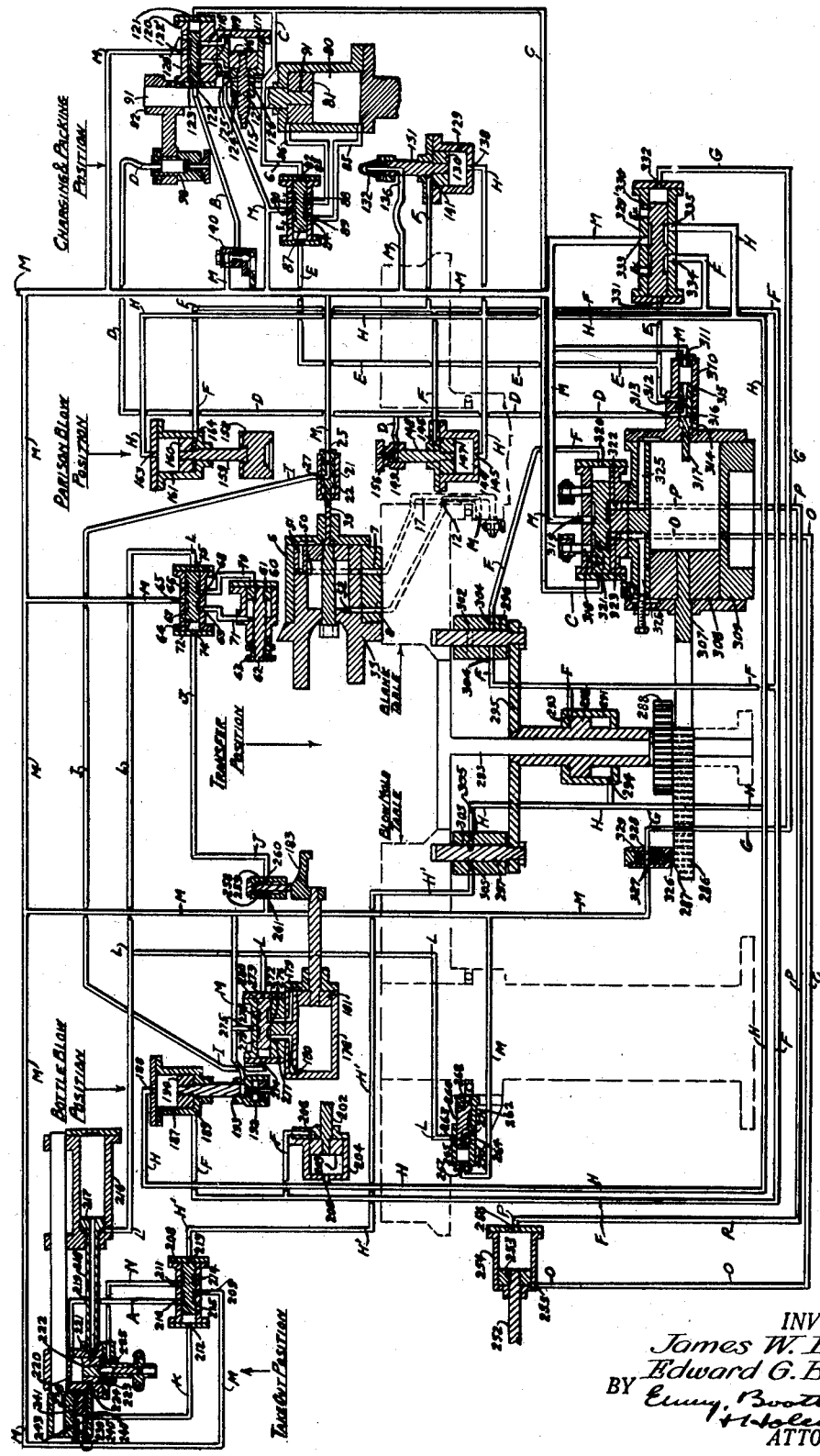

Patented Feb. 27, 1934

1,948,928

UNITED STATES PATENT OFFICE 1,948,928

GLASS BLOWING MACHINE

James W. Lynch and Edward G. Bridges, Anderson, Ind., assignors to Lynch Corporation, a corporation of Indiana Original application June 4, 1917, Serial No. 172,678. Divided and this application December 12, 1930, Serial No. 501,965. In Australia February 7, 1921

26 Claims. (Cl. 49—1)

This invention relates to improvements in glassware forming machines, particularly to the mechism for removing the finished ware from the molds and depositing it on a conveyor or other suitable support, as well as the timing and control mechanism therefor, the subject matter hereof being carved out of parent application Serial No. 172,678, filed June 4, 1917, now Patent No. 1,788,312, granted January 6, 1931, of which this application is a division.

In order better to illustrate our present invention, reference is made to the accompanying drawings illustrating the invention as applied to a machine for making glass bottles, jars or the like, although it will be apparent that the invention in many of its aspects is applicable to other types of machines.

In the drawings:

Fig. 1 is a plan view of the blank table and cooperating parts;

Fig. 2 is a corresponding view of the blow table and the corresponding parts;

Fig. 3 is a central vertical section on line 3—3 through the structure shown in Fig. 1;

Fig. 4 is a central vertical section on line 4—4 through the structure shown in Fig. 3;

Fig. 5 is an elevation of the pedestal or stand of the blank table;

Fig. 6 is a plan view of the structure shown in Fig. 5;

Fig. 7 is a section on line 7—7 of Fig. 5;

Fig. 8 is a section on line 8—8 of Fig. 5;

Fig. 9 is a section on line 4—4 of Fig. 3 and showing the stationary valve at the delivery station of the blank mold;

Fig. 10 is a section through the cam actuated valve at the transfer station of the blow table, said section being taken on the line 10—10 of Fig. 4;

Fig. 11 is a section on line 11—11 of Fig. 2;

Fig. 12 is an elevation of the guide provided for the gripping members of the delivery mechanism;

Fig. 13 is a side elevation of one of the gripping members of the delivery mechanism; and Fig. 14 is a diagrammatic view of the complete machine, the parts being arranged and shown in sectional elevation.

General description of machine

The type of machine to which our present invention is particularly adapted is illustrated as comprising a blank mold table or carrier 3 and a blow mold table or carrier 5, rotatably mounted upon pedestals 2 and 4 respectively, supported on the base 1. The blank carrier 3 is adapted to carry several blank molds and which can be of any number desired. In the present instance six of these blank molds have been connected to the carrier 3, and each of the blank molds, during one complete rotation of the blank table, is adapted to stop at six distinct stations or positions indicated at I, II, III, IV, V, and VI, respectively.

Each blank mold unit (see Figs. 1 and 3) carried by the carrier includes a hollow bearing member 6 having separate air passages 7 and 8 extending downwardly therethrough and thence downwardly and inwardly within the carrier so as to be opened and closed at certain points during the rotation of the table about the stand or pedestal 2 by the wall of said pedestal.

Formed within the upper portion of the pedestal and in the same horizontal plane are three grooves 9, 10, and 11 (see Figs. 2, 5, 6 and 7) which are designed successively to register with the lower or inner end of the upper passage 7 during the rotation of the carrier. The groove 9 is so located that it will register with the passage 7 for closing the blank mold just prior to its arrival at the charging station I, while the blank mold is at said station I, and also during the movement of the blank mold from station I to station II. The groove 10 is adapted to register with the passage 7 immediately after the blank mold leaves station II. Passage 7 remains in communication with the groove 10 until just prior to the arrival of the blank mold at station III at which time the lower passage 8 comes into register with a short lower groove 12 (Figs. 5, 6 and 8) in the stand or pedestal 2. This lower groove is in communication through an inclined passage 13 with the third upper groove 11 and remains in communication with the passage 8 until after the blank mold has left its station III and has almost reached its station IV. As the blank mold reaches its station V the upper passage 7 comes into communication with the groove 11 and this groove is in communication, through oblique passage 14 with the groove 9. The groove 9 is adapted to receive pressure through a vertical bore 15 and another vertical bore 16 is adapted to direct pressure into the groove 10. Thus it will be seen that when air under pressure is directed into these two bores, the uniform pressure of air will be maintained in the grooves 9, 10, 11 and 12.

When the blank mold is at station III the upper passage 7 will communicate with an exhaust bore 17 (Fig. 6) formed in the stand or pedestal 2. Another exhaust bore 18 (Fig. 6) is formed in the stand or pedestal 2 and is adapted to register with the inner end of the lower passage 8 when the blank mold arrives at its station V.

Secured to and extending upwardly from the stand or pedestal 2 is a tubular extension 19 constituting a cam track (see Fig. 3) there being formed on or secured to this extension along a radial line extending between stations II and III a cam 20 (Fig. 9). Connected to this cam track (see Fig. 9) on a radial line extending through station III of the blank mold is a valve casing 21 in which a valve 22 is mounted to reciprocate, this valve being provided with an annular groove 23 near its outer end and which groove communicates with a central bore 24 extending into the valve from its inner end. Thus when pressure from the main air line is directed against the inner end of the valve through a pressure port 25, the valve will be shifted against the opposite end of its casing 21 and the stem 26 of the valve will be pressed outwardly from the surface of the track or extension 19. When the valve is in this position, the groove 23 is out of register with an outlet port 27 (shown in Fig. 14).

Formed with or connected to the upper end of the track or extension 19 are oppositely extending segmental wings 28 and 29, (see Fig. 1) the wing 28 being arranged above the blank table 3 between stations V and VI while the peripheral portion of the wing 29 is arranged above the blank mold carrier 3 over the space between stations II and III. Connected to or formed with the bottom face of the wing 28 (see Fig. 3) is an arcuate rack 30 while another rack 31 is arranged on the bottom face of the peripheral portion of the wing 29. The wing 28 has an extension 32 (see Fig. 1) which is arranged back from the rack on the wing 29 and extends over the carrier 3 at station III. These wings are, of course, fixed relative to the stand or pedestal 2 and the racks serve as operating means for the revoluble cylinders as will be hereinafter pointed out, while the wing 29 constitutes a support for the portion of the transfer mechanism to be described hereinafter.

Journaled within each of the bearing members 6 is a cylinder 33 (see Fig. 3) having a piston chamber in its inner end as indicated at 34 and the inner end of this piston chamber is closed by a head 35 from the center of which projects an angular boss 36 (see Fig. 3). This boss is provided with diametrically opposed flat faces parallel with each other and one of these faces is adapted, during the movement of the blank mold from station VI to station II to ride along the lower edge of a track 37 depending from the top portion of the extension 19. Thus during this portion of the movement of the blank mold about the stand or pedestal 2 the cylinder 33 cannot rotate about its longitudinal axis and such rotation can only occur after the boss 36 has passed out of engagement with the lower edge of the track 37. Another similar depending track 38 (see Fig. 3) extends downwardly from the upper portion of the extension 19 and located between stations III and V, and is adapted to be engaged by the other flat face of the boss after the revoluble cylinder has been turned one half revolution as hereinafter described, thus to hold the revoluble cylinder against movement out of position to which it has been turned.

Slidably mounted in the cylinder head 35 is a plunger 39 (see Fig. 3) and this plunger is adapted, when the blank mold is brought to station III, to aline with the stem 26 of valve 22, said plunger being pressed outwardly into the piston chamber 34 by coming against the cam 20 (see Fig. 9) just prior to the arrival of the plunger 39 at station III. Formed on or secured to the cylinder 33 close to the outer face of the bearing member 6 is a gear 40 adapted, during each complete rotation of the blank table, to successively engage the racks 30 and 31, it being understood that each rack is so proportioned relative to the gear that it will cause the gear to make a one half revolution while passing from one end to the other of the rack. Extending from the outer face of the gear 40 (see Figs. 1 and 3) are upper and lower ears 41 and 42 and these ears are connected by a pivot pin 43 on which are mounted arms 44 extending from the opposed members 45 of the blank mold. Pivotally connected to each of the arms 44 adjacent the center thereof and close to its mold member 45 is a link 46, and the two links of the mold being extended inwardly and attached to a cross head 47 which extends between the upper and lower ears 41 and 42. This cross head is attached at its center to the rod 48 of the piston 49 mounted to reciprocate in the cylinder chamber 34. An annular groove 50 is formed in the cylinder 33 and constantly communicates with the passage 7. A passage 51 extends longitudinally within the wall of cylinder 33 and connects the groove 50 with the inner end of the cylinder where it opens through a port into the inner end of the piston chamber 34. A port 52 is formed in the outer end portion of the cylinder 33 and is adapted, when the cylinder is rotated through 180°, to come into register with the upper end of the passage 8 thus to direct air under pressure from said passage against the outer face of the piston 49.

Assuming that air under pressure is supplied to the bores 15 and 16 (see Figs. 3, 5 and 6) and is thus distributed to the grooves as hereinbefore described, it will be apparent that when the blank mold arrives at station I the passage 7 and groove 9 will direct pressure by way of groove 50 and passage 51 to the back face of the piston 49 with the result that said piston will be directed outwardly against the outer end of the chamber 34 and the links 46 will press against the arms 44 to hold the mold members tightly together. As the blank mold moves from station I to station II the pressure against the piston 49 will be maintained through the groove 9. Immediately after the blank mold leaves station II the gear 40 will engage the rack 31 so as to rotate the cylinder through 180°, thereby to invert the blank mold, pressure being maintained back of the piston 49 during this rotation through the annular groove 50. Just as the cylinder completes its half revolution about its longitudinal axis the port 52 will be brought into register with passage 8 so that pressure through groove 12 will thus be directed against the outer face of the piston 49 and said piston driven inwardly so as to pull on links 46 and move the mold members 45 apart. During this inward movement of the piston the passage 7 has been brought into register with the exhaust bore 17. The groove 12 through which pressure is distributed to the outer face of the piston 49 when the mold is at station III, continues to direct pressure against said piston until just prior to the arrival of the mold at station IV. When the mold arrives at station V, the passage 8 comes into register with the exhaust bore 18 and the passage 7 comes into register with the groove 11 so that pressure is directed from said groove 11 and the passage 7 to the back face of the piston 49 with the result that the members of the blank mold are swung together and are maintained in this position while the mold is moving from position V to position I. Pressure is maintained against the piston while the mold is moving from position V to position VI and during this stage of the movement of the mold the gear 40 comes into mesh with the rack 30 thus causing a one half revolution of the cylinder 33 so that when the cylinder arrives at station I it will have the same position as when it started its cycle of movement.

Pivotally mounted on one end portion of the pin 43 (see Figs. 1 and 3) are oppositely extending jaws 53 the outer ends of which are attached segmental members 54 constituting the sections of the neck rings. These sections are adapted to close together at the neck end of the blank mold and are adapted to be surrounded by a portion of the blank mold as is usual in devices of this character. Connected to the jaws 53 between their ends are links 55 and these links are in turn attached to a cross head 56 which has a guide pin 57 slidably mounted in an opening 58 formed in the gear 40. A lug 59 projects from the cross head 56 and extends downwardly when the mold is at station I but projects upwardly when the mold is at station III. When the lug and cross head are at their outermost positions, the links 55 press against the jaws 53 and hold the members of the neck ring closed together, but when the lug 59 and its cross head are drawn inwardly the members of the neck rings are shifted away from each other.

Mounted on the extension 32 of the wing 29 at station III is a cylinder 60 containing a piston 61 from which projects a stem 62. Connected to the outer end of this stem is a spool 63 and this spool is designed to be held at its outermost position under normal conditions so that when the blank mold arrives at station III the lug 59 will enter the groove in the spool.

Mounted on the wing 29 is a valve casing 64 (see Figs. 3 and 4), this casing being provided with a pressure inlet port 65, exhaust ports 66 and 67, and outlet ports 68 and 69. The outlet port 68 is located between the inlet port 65 and the exhaust port 66, while the outlet port 69 is located between the inlet port 65 and the exhaust port 67. Constant pressure is directed against the port 65 and the outlet port 68 communicates with the inner end of the cylinder 60 through a passage 70. A passage 71 connects the outer end of the cylinder 60 to the outlet port 69.

A valve 72 is mounted to reciprocate within the casing 64 and has a centrally enlarged portion 73 adapted to normally close the port 65 and also having enlarged end portions or heads. These heads are adapted to alternately close the exhaust ports 66 and 67. A pressure inlet port 74 is formed in the inner end of the valve casing 64 and another pressure inlet port 75 is formed in the outer end of the valve casing. Thus it will be seen that when pressure is directed through port 74 against the valve 72, which action will take place when the mold reaches station III the inlet port 65 will be placed in communication with the outlet port 69 while the outlet port 68 will be placed in communication with the exhaust port 66. Thus air under pressure will flow through the passage 71 and against the outer face of the piston 61, forcing said piston inwardly and causing the spool to pull the lug 59 inwardly and move the members of the neck ring away from each other.

The foregoing operation is preferably so timed relative to the opening of the blank mold at station III that the members of the neck ring will not open out until after the members of the blank mold have become disengaged from the glass article and the members of the blow mold hereinafter referred to have engaged the article.

It may be stated at this time that when the members of the blank mold are moved apart at station III the piston 49 will strike the plunger 39 (Fig. 9) and force it against the stem 26 of valve 22, thus causing said valve to shift inwardly and bring the pressure inlet 25 into communication with the outlet port 27. This will control certain other operations as will be hereinafter pointed out.

Suitably mounted on the base 1 adjacent station I is a support for the compacting blowing device which includes a blow head table 79 containing a cylinder 80 in which a piston 81 is mounted to reciprocate. Arranged on one side of the cylinder 80 is a valve casing 82 which is provided, near each end, with an outlet port (see Fig. 14) one of which has been indicated at 83, while the other has been indicated at 84. The port 84 is in communication, through a passage 85 with the lower end of the cylinder 80 while the port 83 is in communication through a passage 86 with the upper end of the cylinder. A valve 87 is slidably mounted within the casing 82 and has annular grooves 88 and 89 designed, when the valve is shifted in one direction, to establish communication between port 84 and the pressure port 90, and when shifted in the opposite direction, to establish communication between port 83 and the pressure port 90. The port 90 is connected to a pressure pipe as hereinafter pointed out.

A rod 91 (Fig. 14) extends upwardly from the piston 81 and is provided, at its upper end, with a head 92. Extending from the head 92 is an arm 97 to the outer end of which is attached a cylinder 98. Air under pressure is adapted to be directed, under certain conditions to the upper end of the cylinder through a flexible pipe, a portion of which has been indicated at 99 and the lower end of the cylinder is provided with an air outlet 100 in which a tubular stem is adapted to slide.

Thus it will be seen that when the head 92 moves downwardly as hereinbefore described the blow head 105 will come against the upper end of the blank mold at station I and will be shifted relative to the cylinder 98 so that its valve will be unseated and the air under pressure within the cylinder will be discharged downwardly on to the gather which may have been deposited in the blank mold at station I. When the head 92 is pushed upwardly it will first move the blow head straight up away from the blank mold and may then swing it to one side and on the downward movement of the head 92 this motion will be reversed. Consequently when the blow head is in its normal position it is above but at one side of the blank mold at station I and will not interfere with the placing of a gather downwardly into the blank mold.

Upstanding from the blow head table 79 (see Figs. 1 and 14) at the inner edge thereof is a pivot pin 107 securing a spring disk holder 108 on which is mounted a ring 109 adapted, when the blank mold is brought to position at station I, to overhang and contact with the upper end of said blank mold. The pin 107 also serves as a pivot for the intermediate portions of crossed levers 110, each lever having one arm sharpened to constitute a shear blade 111 while the other arm of each lever is slotted longitudinally as at 112 (see Fig. 1). The two slotted arms are slidably engaged by studs 113 (Fig. 1) extending from the free ends of a fork 114 provided at one end of a stem 115 projecting from a piston 116. This piston is mounted to slide in a cylinder 117, said cylinder having ports 118 and 119 at the outer and inner ends thereof respectively and which ports communicate with the valve casing 120. Another port 121 (Fig. 14) is arranged at one end of the valve casing 120 and another inlet port 122 is provided at the other end of the casing 120. A pressure inlet port 122' is located between the ends of the casing 120 and exhaust ports 120' are also provided. A valve 123 is slidably mounted in the casing 120, and when pressure is directed through port 122 against one end of this valve, said valve is shifted so as to close communication with port 118 and pressure will be directed from line M to port 119.

The stem 115 of piston 116 slides within a casing 124 and this casing has opposed ports 125 and 126 (see Fig. 14). An annular groove 127 is formed in the stem 115 and when the piston 116 is forced in one direction by the admission of pressure through port 119, this stem 115 will be moved with the piston to bring the groove 127 into register with the two ports 125 and 126, thus to establish communication between the ports.

A spring may be mounted on the pivot pin 107 to bear downwardly on the levers 110 so as to bind them together.

As the piston 116 is normally pressed toward the guide plate 96, the two shearing blades are normally held apart. However, when pressure is directed against the inner face of the piston 116 so as to force it in the other direction, these blades will be swung toward each other so as to shear the gather suspended therebetween, this shearing action taking place directly over the ring 109.

Mounted at the charging station I below the molds 46 is a cylinder 129 in which a piston 130 is mounted to slide (see Fig. 14). The stem 131 of this piston projects upwardly beyond the top of the standard and is provided, at its upper end, with a head 132 from the top of which extends a tapered plunger or neck pin 133. This neck pin may be hollow and closed at its upper end and extending from the base portion of the plunger or neck pin are radial outlets communicating with the interior of said plunger or neck pin. A bore is formed in a stem 131 and has a pressure inlet port 136 while extending from the upper end of the bore is a tubular nozzle 137 extending into the hollow plunger or neck pin but spaced from the walls thereof. Thus it will be seen that air under pressure when directed into the stem 131 will be discharged upwardly against the inner walls of the plunger or neck pin 133 and will then flow downwardly around the nozzle and out through the outlets. This acts as a means for cooling the neck portion of the partially completed blank when the gather is packed into the blank mold.

An inlet port 138 is provided in the bottom of cylinder 129 so that when air under pressure is directed therethrough, the piston 130 will be raised and the neck pin or plunger elevated into the neck ring 54 at the lower end of the mold at station I.

At station II is a suitable mounting below the molds 46 for a cylinder 144, provided with a port 145 at the bottom thereof and another port 146 at the top thereof. A piston 147 is mounted to slide within the cylinder and has a stem 148 projecting upwardly therefrom and carrying a blow head 149. When the blow head is elevated so that the disk 156 will come against the neck rings of the blank mold at station II, the pressure air will pass from the blow head into the recess in the blank which had been formed at station I by the neck pin or plunger. Consequently the gather will be initially blown.

For the purpose of finishing the upper end of the blank at station II and also limiting the upward movement of the blown gather, a baffle disk 158 (Fig. 14) is connected to the lower end of the stem 159 and a piston 160. This piston is mounted to slide within a cylinder 161 suitably mounted at station II above the blank molds. The cylinder 161 has a port 163 at its upper end and another port 164 at its lower end, and when pressure is directed into the lower port the baffle disk will be raised. While pressure is directed into the upper port, the baffle disk will be lowered as will be obvious. The two pistons 147 and 160 are adapted to be operated simultaneously by means of pressure in the air system to be hereinafter described, as soon as the blank mold stops at station II.

The blow table or carrier 5 (Figs. 2 and 4) which may be mounted for rotation on a stand or pedestal 4, is spaced from the blank table 3 and is provided at its periphery with a series of mold bottoms 165 equal in number to the number of blow molds assembled with the table. In the present instance six blow molds have been illustrated, but it is to be understood that this number may be increased or varied as desired. The two tables are adapted to rotate in unison by means of mechanism hereinafter more fully described so that each time a blank is brought to position at station III and while said blank is being suspended solely by the neck rings of the blank mold, a mold bottom 165 is brought to position under the supported blank and an open blow mold is brought to position to grip the suspended blank, this gripping action taking place immediately prior to the release of the blank from the neck ring members of the blank mold. In order that this operation may take place it is preferable that the members of the blank mold and the members of the blow mold be coupled to occupy positions concentric with a common center, during the transfer of the blank from one table to the other.

The blow molds, where six of them are used, are adapted successively to assume every one of six stations indicated respectively at I', II', III', IV', V', VI'. Station I' is located at the point of transfer and the other stations are disposed successively in counter-clockwise arrangement about the table 5. As all of the blow molds are of the same construction, it is deemed necessary to describe only one of them in detail, it being understood that each blow mold passes successively to all of the stations of the blow table and returns to station I' after it has completed one cycle.

Referring to Figs. 2 and 4 one of the mold bottoms 165, as before stated, is provided for each blow mold, these bottoms being adapted to assume positions successively under the blanks successively brought to the point of transfer. Mounted on the table 5 at regular intervals are brackets 166 each of which has pivotally connected to the outer end portion thereof arms 167 extending from the respective members 168 of the blow mold. Guide rods 169 are carried by the bracket and slidably mounted on these rods is a cross head 170 having a centering recess 171, adapted, when the cross head is in its outermost positions relative to the bracket to receive a centering lug 172 extending inwardly from the bracket. The cross head has a roller 173 on its upper face and slidably mounted in the sides of the cross head are links 174 the outer ends of which are pivotally attached to the respective arms 167. Springs 175 are mounted on these links and are adapted when the cross head is pressed outwardly to thrust against the links and press the members of the blow mold together. A push cam 176 is fixedly mounted above a table and extends from station I' to station IV' and when the blow mold is passing from station I' to station IV' the roller 173 will travel along the periphery of this push cam so as to hold the members of the blow mold closed together tightly.

Fixedly mounted above the blow table so as to extend fom stations IV' to I' is a pull cam 177 designed to receive the roller 173 as it leaves station IV' and gradually pull said roller inwardly as it passes to the next two stations V' and VI', this pulling action serving to pull the members of the blow mold gradually to open positions until, when the blow mold reaches and passes station VI' the members of the blow mold are drawn back close to the periphery of the blow table so that they can move readily into position at station I' without coming into contact with the blank mold and the blank which have been brought to station III of the blank table. As soon as the blow mold reaches station I', the roller 173 will pass off of the end of pull cam 177 and into the path of setting mechanism provided therefor.

Mounted on the stand or pedestal 4 and above the blow table is a cylinder 178 (Figs. 2 and 4) having end ports 179 and 180 and slidably mounted in this cylinder is a piston 181, the stem 182 of which is adapted to work along a radial line extending to station I'. This stem is provided at its free end with a tapered button 183, and when the roller 173 passes off of the end of pull cam 177 at station I', it arrives in position in the path of this button so that when pressure is at this time directed from port 180 against the piston 181, the button 183 will be pressed outwardly against the roller and cause the cross head 170 to slide outwardly along its guide rods 169 and until it comes against the outer portion of the bracket 166. This action will cause the members of the blow mold to swing together, under the neck ring sections of the blank mold and about that portion of the blank which has been released from engagement with the members of the blank mold. This outward movement of the cross head 170 also brings the roller 173 into position where it can pass into engagement with the periphery of the push cam 176 when the blow mold begins to leave its station I'.

The blow mold when it leaves station I' carries the blank to station II' where it is held firmly in the blow mold and then passes to station III'. At station III' the blowing of the blank is completed by the use of a special blow head provided for that purpose. Mounted at the station above the blow molds is a cylinder 187 having ports 188 and 189 in the top and bottom thereof respectively, and which are adapted to receive pressure as hereinafter pointed out. A piston 190 is slidably mounted in the cylinder and has a stem 191 projecting downwardly therefrom and connected, at its lower end, to a blow head 192 having a pressure port 193. When pressure is directed onto the upper face of the piston 190, the blow head will be lowered to engage the mouth of the blank held in the mold at station III', so that air pressure will pass from port 193 through the blow head and into the blank. When pressure is directed against the bottom of the piston 190 said piston will be raised and the blow head removed from the blank so that valve 195 will close automatically.

A suitable clamping mechanism is provided to hold the blow mold section closed during final blowing and may include opposed jaws 200. Links 201 are connected to the rear ends of the jaws back of the pivotal connections and are in turn pivoted to the stem 202 of a piston 203. This piston is slidably mounted in a cylinder 204 mounted on the table 185 and the said cylinder is provided at its ends with ports 205 and 206 respectively. Thus when the blow mold arrives at station III', pressure will be instantly directed, as hereinafter described, through port 205, thereby forcing the piston 203 inwardly so that the stem of the piston will push through the toggle links 201 against the rear ends of the jaws 200 and cause the other ends of the jaws to swing towards each other. Thus the jaws will receive between them a clamp upon the free longitudinal edge portions of the members of the blow mold and will hold said members securely together so that they will not push apart when subjected to internal pressure. Immediately after the completion of the blowing operation the piston 203 will be moved outwardly and the clamping jaws disengaged from the blow mold, this action taking place just prior to the movement of the blow mold away from station III'.

Suitable mechanism for controlling the various mechanisms of the machine may comprise a valve casing 258 (see Fig. 4) in which is slidably mounted a poppet valve 259 (see Fig. 14) the stem of which projects downwardly into the path of the tapered button 183. This valve casing has a pressure port 261 and an outlet port 260, the two ports being normally out of communication. However, when the button is thrust outwardly so as to cause the blow mold to engage a blank delivered to station I', the button will lift the poppet valve and establish communication between the pressure port and the outlet port.

Connected to the stand or pedestal 4 below the blow table at station I' is a valve casing 262 (Fig. 4) this casing having opposed ports 263 and 264 (Fig. 14) which normally communicate through an annular groove 265 formed in a valve 266. A pressure port 267 is provided at one end of the valve casing. The valve projects from the other end of this casing and carries a roller 268 which is adapted to be successively engaged by a series of cams 269 on the hub portion of the blow table, one of these cams being provided for each blow mold (Fig. 18). A longitudinal bore 270 extends into the valve 266 and has a radial port 271. Each time one of the cams 269 comes against the roller 268, the valve 266 will be pressed outwardly, thereby closing communication between the opposed ports 264 and bringing the port 271 in communication with one of the opposed ports so that pressure will be directed thereto from the port 267 for the purpose hereinafter pointed out.

Mounted adjacent the cylinder 178 is a valve casing 272 (Figs. 4 and 14) having end ports 273 and 274, a central pressure port 275, space outlet ports 276 and 277 and exhaust ports 278 and 279. The outlet ports 276 and 277 are in communication with the end ports 179 and 180 respectively, of the cylinder 178. A valve 280 is slidably mounted in the casing 272 and is provided with spaced reduced portions extending annularly therein. These reduced portions are so proportioned that when the valve 280 is shifted to the left, the port 277 is placed in communication with the exhaust port 279 while the pressure port 275 is placed in communication with the outlet port 276. When pressure is directed against the other end of the valve, it will be shifted so as to reverse the direction of pressure past the valve and into the cylinder 178.

Each of the tables 3 and 5 has a gear formed on or secured to the periphery thereof, the two gears being indicated at 281 (Figs. 3 and 4). Both gears constantly mesh with an intermediate gear 282 (Figs. 1 and 2) arranged between the two tables at stations III and I'. The gear 282 (Figs. 3 and 4) is keyed or otherwise secured to the upper end of a shaft 283 which is journaled at its lower end in a bearing 284 on the base 1. The lower portion of the shaft is arranged in a housing 285 on the base and mounted to reciprocate within this housing is a rack bar 286, the free end of which is beveled at the top as shown at 287, (see Fig. 14).

A gear 288 is feathered on the shaft 283 and is coupled as at 289 to a sleeve 290 mounted to slide on the upper portion of the shaft and guided within the housing 285.

The upper portion of the housing is formed with a cylinder 291 in which a piston 292 is adapted to reciprocate. This cylinder has a port 293 at its upper end and another port 294 at its lower end. These two ports are connected to the pressure system as hereinafter pointed out.

Connected to the upper end of the sleeve 290 is a cross head 295 designed to move upwardly and downwardly with the sleeve when actuated by the piston and attached to the outer ends of this cross head are combined bolts and valves 296 and 297 which are slidably mounted within bores 298 and 299 respectively, in outstanding arms 300 which constitute bearings for the gears 282. These outstanding arms are connected to the housing 285 by means of standards 301. The combined bolt and valve 296 has an annular groove 302 and a similar groove 303 is formed in the combined bolt and valve 297. Opposed ports 304 are formed in the outstanding arm at opposed portions of the bore 298 and opposed ports 305 open into the bore 299. Thus when the combined bolts and valves are moved upwardly and downwardly, they will momentarily establish communication between the ports 204 and between the ports 205 respectively. When the bolts are moved upwardly, which action takes place as soon as the two tables come to a stop, they will enter openings formed in the peripheral portions of the tables so as to lock the tables against movement. These openings are so located that each time one of the blank molds is brought to station III and one of the blow molds is brought to station I', certain of the openings will be in position to receive, and will receive the bolts.

The rack bar 286 is connected to or formed with the stem 307 of a piston 308 (see Figs. 1 and 14). This piston is designed to reciprocate within a cylinder 309 (Fig. 1) mounted on the base 1 between the stations II and I'. Back of the cylinder is arranged a supplemental valve casing 310 (Fig. 14) having a pressure port 311 at its back end while at the side of this supplemental valve casing are provided spaced outlet ports 312 and 313 and an exhaust port 314. A valve 315 is slidably mounted in the supplemental casing 310 and has an annular groove 316 in communication with a longitudinal bore extending into the valve from the pressure end thereof. A stem 317 projects from the valve and into the cylinder 309 so that when the piston 308 is moved backward, it will strike the stem and shift the valve 315 to establish pressure between the ports 311 and 312 and to open the exhaust 314. Under normal conditions communication is established between the port 311, groove 316 and port 313.

Arranged adjacent the cylinder 309 is a valve casing 318 having an intermediate pressure port 319, and ports 320 and 321 and spaced outlet ports 322 and 323. A valve 324 is mounted for reciprocation in this casing and has spaced reduced portions so that when pressure is directed from port 320 against the valve, the pressure port 319 will be placed in communication with outlet port 322, and when the valve is shifted in the opposite direction pressure will be directed from port 319 to 323. The port 322 is in communication with a back port 325 in the cylinder 309 while the port 323 is in communication with a front port 326 in said cylinder 309.

The beveled end 287 of the rack bar is adapted, when said rack bar is shifted forwardly by the piston 308 to move under and lift a poppet valve 326', thus to establish communication between a pressure port 327 and an outlet port 328 in the casing 329 of the valve.

Mounted on the base 1 between stations I and II is the casing 329' of a controlling valve 330. This casing has end ports 331 and 332, and intermediate pressure port 333 and spaced outlet ports 334 and 335. Opposite positions of the valve 330 control the admission of air pressure respectively to ports 334 and 335.

The above described machine is a typical one to which our take-out mechanism may be applied, and is only intended as illustrative of the manner of using and controlling the take-out mechanism. The construction and arrangement described above is claimed in our parent application Serial No. 172,678, filed June 4, 1917.

*Delivery mechanism*

When the blow mold leaves station III', it moves to station IV' where the blown article will partly cool and will be given a chance to set. No mechanical action takes place at this station. The delivery of the blown article takes place at station V' (see Fig. 2) and to effect this operation a novel form of mechanism has been provided. According to our invention, a valve casing 208 (see Figs. 11 and 14) is suitably mounted at station V' and has a central pressure inlet port 209 and spaced outlet ports 210 and 211. End ports 212 and 213 are provided in the casing and slidably mounted in this casing is a valve 214 having spaced annular grooves 215. A cylinder 216 is located preferably above the casing 208 and slidably mounted therein is a piston 217 having a stem 218 which projects beyond the outer end of the casing 216. A passage 219 extends longitudinally through the stem 218 and also through the piston and mounted on the outer end of the stem is a cylinder 220 having a port 221 which communicates constantly with the passage 219. Slidably mounted in the cylinder 220 is a piston 222 having an annular groove 223 which normally maintains a communication between the port 221 and an outlet port 224. Another port 225 is provided at the bottom of cylinder 220. The stem 226 of the piston extends downwardly beyond the cylinder 220 and has a central bore 227 extending thereinto from its lower end. A port 228 is formed in the stem 226.

A cross head 229 (see Fig. 11) is carried by the stem 226 and works between two hangers 230 which have opposed slots 231. A longitudinal slot 232 is formed in the lower portion of the stem 226 and a connecting pin 233 is slidably mounted in this slot and in the slots 231 and passes through the center holes of the arms 235 and acts as a pivot pin for these members while hooks 236 are opening and closing. A plunger 234 is slidably mounted in the bore 227 and bears on the pin 233. Crossed arms 235 are pivotally and slidably connected at their upper ends to the ends of the cross head 229 and attached to the lower end of each of these arms is a gripping fork 236, the two forks being extended toward each other. It is to be understood that when pressure is directed through the port 225 and against the bottom of the piston 222 pressure will immediately pass through the port 228 into the bore 227, thus causing the plunger 234 in bore 227 to hold pin 233 down tightly on bottom of slotted portion 231 in hangers 230 while piston 222 moves upward and closes the gripping forks about the article. At this stage of the operation the lower end of slot 232 has been raised and comes in contact with the pin 233 and the continued upward movement of the piston 222 raises said pin 233, arms 235, hooks 236 and the article of glass upward, this being permissible at this time because the members of the blow mold have been opened out during movement to this station V' in the manner hereinbefore pointed out.

The cylinder 220 is slidably mounted on a supporting rod 237 which projects outwardly beyond the blow table and is provided at its outer end with a valve casing 238. This valve casing has a pressure port 239 at one end and an intermediate outlet port 240. A valve 241 is slidably mounted in this casing and has an annular groove 242 communicating with a central bore 243. A stem 244 extends from the valve and toward the cylinder 220. Thus when the piston 222 has been fully raised the port 221 will be placed in communication with the port 225 with the result that air under pressure will flow along the bore in the piston stem 218 and back of the piston 217. Consequently said piston will be forced outwardly within its cylinder and the cylinder 220 will be brought forcibly against the stem 244. This will cause the valve 241 to shift so as to bring the pressure port 239 into communication with the outlet port 240 which will result in the transmission of pressure through port 212 against one end of the valve 214 thereby shifting the valve to reverse the direction of pressure in the cylinder 220 and cause the piston 222 to be lowered after which the gripping forks will be moved apart to release the article engaged thereby. After the delivery of the engaged articles as described, the piston 217 will be returned to its initial position by air pressure in the manner hereinafter described. Thus the delivery mechanism will be reset, it being understood, of course, that the valve 241 will be automatically returned to its normal position when the cylinder 220 is removed therefrom, by the pressure against the large end of the valve. The lifting action of the delivery mechanism is desirable in order that the molded article may be lifted off of a mold bottom at station V'.

During the movement of the blow mold to and past station VI', the mold is allowed to cool and will be opened out as hereinbefore described.

A suitable conveyor mechanism may be located adjacent station V' (see Fig. 2) of the blow table and may comprise an endless conveyor belt 245 which can be made of a chain or constructed in any other manner desired, and adapted to be moved by any suitable means, as for instance, a fluid pressure operated rod 252 connected to a piston 253 mounted to slide within a cylinder 254, the cylinder being provided at its end with ports 255 and 256, respectively. The ports of the cylinder are so connected to the pressure system that at predetermined times during the operation of the machine the piston 153 will be shifted in one direction so as to move the belt 245 a sufficient distance to convey an article which has been deposited on the belt out of the way of the next article to be deposited thereon.

The various pistons, valves, blow heads, etc., are adapted to be supplied with air under pressure from a pressure supply pipe M. By referring to the diagram (Fig. 14) it will be seen that this pressure line M extends to one of the ports of the punty valve 140, to the port 90 of the valve casing, 82, to the plunger 132, to port 125 of casing 124, to inlet to valve casing 120, to port 25 in casing 21, to port 65 in casing 64, to port 327 in casing 329, to the port 333 in valve casing 329', to port 319 in valve casing 318, and to port 311 in valve casing 310. The main supply line then extends to certain of the apparatus on and adjacent the blow table and communicates with the port 267 in casing 262, with port 261 in valve casing 258, with port 275 in valve casing 272, with the blow head 192, with the port 239 in valve casing 238 and with port 209 in valve casing 208. This pressure is constant in the various valve casings mentioned and where it comes against the end of a valve it holds said valve normally unseated from the outlet port as shown, for example, at casing 21, casing 310, casing 262, and casing 238. Constant pressure is maintained in the plunger 132 and blow head 192, but, obviously is not released therefrom until this blow head is shifted out of its normal position as has hereinbefore been described.

In addition to the pressure line M there are various other pressure lines which are designed during certain stages of the operation to direct pressure against certain parts of the apparatus from the pressure line M, thereby to produce the various operations in accurately timed succession.

A line A connects the upper end of the cylinder 220 with the port 210 in valve casing 208.

Line N connects the port 225 in the bottom of cylinder 220 with the port 211 in casing 208.

Another line X connects the port 240' in casing 238 with the port 212 in casing 208.

A line H extends from the port 205 in cylinder 204, and from port 188 in cylinder 187, to the port 294 of cylinder 291, to the port 138 of cylinder 129, to the port 145 of the cylinder 144, to port 163 of cylinder 161, to port 335 of valve casing 329' and to one of the ports 305 of bolt valve 297.

Another line H' extends from the other port 305 to port 213 in casing 208.

Another supplemental pressure line P extends from the port 256 in cylinder 254 and thence to port 325 in cylinder 309 and to port 322 in valve casing 318.

A line F communicates with the port 189 in cylinder 187 and with the port 206 in cylinder 204, and this line extends to the blank table and communicates with the port 164 in cylinder 161, with port 146 in cylinder 144, with the port in the top of cylinder 129, with the port 293 in cylinder 291, with the ports 304 intersected by the bolt valve 296, with the port 320 in the valve casing 318, and with the port 334 in the valve casing 329.

Another supplemental pressure line has been indicated at O, this line opening into the port 255 in cylinder 254, in port 326 in cylinder 309, and in port 323 in valve casing 318.

Another supplemental pressure line has been indicated at L, this line opening into port 273 of valve casing 272, port 263 in valve casing 262, port 75 in valve casing 64, and to a port in the outer end of cylinder 216.

Another supplemental pressure line has been indicated at J, and extends from the port 260 in valve casing 258 to port 74 in valve casing 64.

A supplemental line I maintains communication between port 274 in casing 272 and port 27 in casing 21.

A supplemental pressure line G leads from the port 121 of valve casing 120 and communicates with the port 126 in valve casing 124 with one of the end ports in valve casing 82, and with the port 321 in valve casing 318.

A short supplemental pressure line B connects the punty valve 140 with the port 122 in valve casing 120.

A supplemental pressure line D opens in the blow head 98, the blow head 148 and the port 313 of valve casing 310. Another line E extends from the port 312 in valve casing 310 and opens into the port 331 in valve casing 329' and into the other end port in the valve casing 82.

An additional supplemental pressure line has been indicated at G and extends from the port 328 in valve casing 329 to the port 332 in valve casing 329'.

Operation

The operation of the various units of the apparatus has already been described, but in addition thereto the general operation of the machine might be described as follows.

With all parts in normal position, a charge of molten glass is deposited in the blank mold at station I and the punty valve is depressed by the gatherer if the machine is fed by hand, which allows air under pressure to pass from line M to line B which leads to the end of the valve casing 120. This moves the valve therein to position to admit air to the front of piston 116 of cylinder 117, which action closes the shear blades as already described. When piston 116 reaches the end of its backward stroke, groove 127 of stem 115 is brought into register with port 125 of the casing 124. This passes air from supply line M to outlet line 6 leading to end of valve casing 120 and causes this valve to move to position to pass air to the rear of piston 116 and cylinder 117, which then opens the shear blades.

If the feeding is accomplished automatically, the shears and punty trip are unnecessary, and the cycle of operation is started by admitting air to line C by means controlled by the feeding device. Line C leads to end of valve casing 82 which moves the valve therein to position to admit air to the top of piston 81 in cylinder 80. This causes the piston to move downward carrying head 92 downward, causing the blow head to swing directly over and down onto the blank mold as already described.

Line C also leads to the end of valve casing 318 causing the valve therein to move to position to admit air to the front of piston to move it backward within cylinder 309. The backward motion of piston 308 can be controlled by throttling the exhaust therefrom. This backward stroke of piston 308 is employed as a timing means and regulates the length of time air under pressure is permitted to remain on the glass within the blank mold at station I. This timing is accomplished in the following manner:

In normal position, constant air under pressure at the rear of valve casing 310 holds valve 315 forward so that its stem projects into cylinder 309 as shown in Fig. 14. With the valve 315 in this position, air passes out of port 313 and through line D to blow heads 148 and 98, which, however, do not blow until pressed tightly against their respective molds. When piston 308 on its backward stroke, reaches projecting stem of valve 315, this valve is caused to move backward, which action closes port 313 and cuts off air to the line D, thereby cutting off air supply to blow heads 148 and 98 and placing this line on exhaust from port 314. The further backward motion of valve 315 brings air to register with outlet port 312, supplying line with air which line E leads to end of valve casing 82, causing the valve therein to move to position admitting air through ports 90 and 84, to the bottom of piston 81 of cylinder 80. This causes the piston to move upward and raise blow head 98 which swings upward and back to normal position.

Line E also leads to end of valve casing 329, moving the valve therein to position admitting air from supply line M to outlet line F which line F admits air to top of piston 130 of cylinder 129, causing this piston to descend and withdraw the neck pin or plunger from the molten glass in the blank mold at station I.

Line F supplies air to top of piston 147 of cylinder 144 which causes this piston 147 to move downward, withdrawing blow head 148 away from the blank mold at station II. This line F also supplies air to the under side of piston 160 of cylinder 161, causing piston 160 to move upward and raise the baffle plate 158 free of the mold at station II.

The line F likewise supplies air to the underside of piston 190 in cylinder 187, causing the piston to raise the blow mold head 192 free of the mold and finished mouth at station III'. The same line F, supplies air to the front of piston 203 of cylinder 204, causing the piston to move backward and open the clamping jaws 200 and release the blow mold at station III'. Air is supplied to the top of piston 292 of cylinder 291 by line F, causing piston 292 to move downward which action shifts the gear 288 into mesh with rack 286 and causes the bolt valves 296 and 297 to pull out of the holes provided therefor in the tables. Both tables are then ready to be advanced one step or station. It will be noted that all pistons operated by action of air through line F are moved simultaneously except the downward motion of piston 292 in cylinder 291, which action is preferably controlled or delayed by throttling the exhaust from beneath this piston. With register pin 296 in lowered position, groove 302 is in register with ports 304 and air from line F is permitted to pass to the end of valve casing 318, which causes the valve therein to move so as to admit air to the rear of piston 308 of cylinder 309, which moves piston 308 forward. The forward movement of said piston carries forward the rack 286 which is in mesh with the shiftable gear 288.

During the movement of the tables the roller 268 on the outer portion of valve 266 in casing 262 comes in contact with cam 269 on the hub of the blow mold table 5, which causes valve 266 to move backward bringing port 271 into register with outlet port 263, and allowing air to pass from supply line M to the line L which leads from port 263 to the end of valve casing 272. The valve 280 is thus moved to position to admit air to the front of piston 181 in cylinder 178 and cause the tapered push button 183 to return to normal position. This permits the poppet valve 259 in casing 258 to close and cut off air from supply line M to line J.

Line L leads to the end of valve casing 64 so as to move the valve therein to position to admit air from supply line M to the rear of piston 61 of cylinder 60 which causes spool 63 to move to forward position. Line L leads to front of piston 217 to move back within its cylinder and move the taking-out mechanism back. This is permitted by exhausting through passage 219 in piston rod 218, which exhaust passes around grooved portion of piston 222 and escapes to the atmosphere by way of vent 224 in the side of cylinder 220. The returning of piston 217 of cylinder 216 and the backward movement of cylinder 220 permits air in the rear of valve 241 in casing 238 to force said valve 241 forward. This cuts off register of groove 240 of the valve with outlet port 240′ thereby cutting off the air supply of line K.

When the blank mold containing the charge of glass has been moved from first or filling station I to station II, the turning rack 286 and piston 308 have reached the end of their forward stroke. This brings the beveled end of the rack in contact with the projection of the valve 326′ in casing 329, which lifts the valve so as to admit air from supply line M to outlet line G which leads to one end of valve casing 329′, and moves the valve therein so as to supply air from supply line M to outlet line H. Line H operates to raise piston 130 of cylinder 129 which moves the neck pin or plunger 133 upward within the neck ring of the blank mold at station I, which mold is then prepared to receive another charge of molten glass.

Line H operates to raise piston 147 in cylinder 144 to position the blow head 148 tightly against the neck ring of the blank mold at station II. This line H also acts to lower piston 160 of cylinder 161, which action carries baffle plate 158 downward and tightly holds the same upon the top of the blank mold at station II. The upward movement of blow head 148 which is now tightly pressed against the neck ring, opens the valve therein as hereinbefore described. Line H also directs air against piston 203 which closes the clamping jaws 200, as described. The same line also directs air to piston 190 in cylinder 187 which action lowers blow head 192 at station III′ and brings asbestos washer 199 to sealing position and completes the blowing operation as before pointed out. Air is directed from line H against piston 292 (see Fig. 14) which shifts the gear 288 upward and out of mesh with rack 286 and also acts to raise the bolt valves 296 and 297 and lock the tables. The upward movement of valve bolt 297 causes groove 303 to pass outlet port 305, thereby allowing air to pass from the said line H to end of valve casing 208 (see Fig. 14) which moves the valve therein to position allowing air to pass from supply line M to outlet line N leading to underside of piston 222 (see Fig. 11), thereby moving the piston upward in cylinder 220. The air thus entering the cylinder 220 also and at the same time operates the plunger 234 and the gripping forks as already described.

At the point where piston 222 has passed and uncovered port 221 which extends through the wall of cylinder 220, air passes through piston rod 218 and is admitted to rear of piston 217 in cylinder 216 causing said piston to move forward in its cylinder 216. Air will exhaust through line L to groove 265 in valve 266. When the taking-out mechanism has carried the glass article to the position, directly over the conveyor, as heretofore described, the cylinder 220 comes in contact with the projecting stem of valve 241 which registers groove 240 with the outlet port 240′ of valve casing 238, and permits air to pass from supply line M to outlet line K (see Fig. 14) leading to valve casing 208. This moves the valve therein to position to admit air from supply line M to outlet line A which operates to move piston 222 downward in cylinder 220, which action lowers the glass article to the conveyor and opens the gripping jaws. At this stage of operation the delivering mechanism remains at rest.

The air time on piston 253 of the conveyor mechanism is the same as the air time on piston 308 of cylinder 309. Therefore when air enters cylinder 309 at the rear of piston 308 to cause the tables to turn, air also enters cylinder 254 through line P at the rear of piston 253, causing the conveyor to move forward. Likewise when air enters cylinder 309 at the front of piston 308 causing this piston to move back, air also enters cylinder 254 through line O in front of piston 253, causing this piston to move back. Thus it will be seen that when an article is deposited upon the conveyor by the taking-out mechanism, the action of the conveyor moving forward carries the extended neck portion of the article out of the path of the delivery mechanism.

It will be seen from the foregoing that the entire operation of the machine is automatic, the control being effected by the actuation of the panty valve in the machine illustrated.

The apparatus may be mounted on wheels 336 so as to be conveniently moved from place to place.

We claim:

1. In a glass blowing machine, the combination with a blow mold and means for opening the mold automatically, of opposed pivotally mounted gripping elements, a member supporting the same and including a cylinder, a piston slidably mounted in the cylinder having a depending tubular stem adapted to communicate with the cylinder, a plunger slidably mounted within the stem, and means for directing fluid pressure against the piston and plunger to elevate the piston and bind the gripping members upon an object within the open mold.

2. The mechanism of claim 1 in combination with pneumatically controlled means for reversing pressure upon the piston to successively lower the piston and the gripping members and cut off pressure to the plunger, and means for automatically disengaging the gripping members from the engaged object during the completion of the downward movement of said members.

3. The mechanism of claim 1 in combination with pneumatically operated means under the control of the upward movement of the piston for directing the cylinder and the article engaging members outwardly from the blow mold.

4. The mechanism of claim 1 in combination with pneumatically operated means under the control of the upward movement of the piston for directing the cylinder and the article engaging members outwardly from the blow mold, and means operative after the outward movement of the cylinder for reversing the pressure upon the piston to lower the article engaging members.

5. The mechanism of claim 1 in combination with means for directing the cylinder and the article engaging members outwardly from the blow mold, means operative after the outward movement of the cylinder for reversing the pressure upon the piston to lower the article engaging members, means for automatically disengaging the article engaging members during the lowering of the piston, and means for automatically returning the cylinder to its initial position after said members are disengaged from the article.

6. In a glass blowing machine, the combination with a revoluble blow table, and a blow mold movable with the table, of means for automatically opening the blow mold when brought to a predetermined position, a guide fixedly mounted above the mold at said position, a member slidable on the guide, article gripping devices carried by said member, pneumatically operated means for successively shifting the gripping devices into engagement with the article in the open mold, and raising the article, pressure operated means at one end of the guide for shifting the slidable member with the elevated article, and means operated by said slidable member on reaching the other end of the guide for reversing the pressure to lower the gripping devices, release them from the engaged article, and return the slidable member to its initial position.

7. The combination with a movable supported mold and means for opening the mold when brought to a stand at one position, of a fixed guide at said position, a slidable member thereon, article gripping members carried by the slidable member, pressure operated means for successively shifting the gripping members into engagement with an article in the open mold, and raising the gripping members and the engaged article, pressure operated means for shifting the slidable member automatically on the guide when the article is raised, and means in the path of and adapted to be operated by the slidable member during such movement, thereof, for reversing the pressure to lower the gripping members, release the engaged article, and return the sliding member to its initial position.

8. In a glassware forming machine a circular series of blow molds, a rotatable support therefor, means for automatically opening said molds, means for intermittently rotating said support including a reciprocable actuator, means for removing ware from an open mold comprising ware gripping members movably mounted adjacent the open mold for movement to ware-engaging position over said mold and ware depositing position at a point remote therefrom, a fluid pressure operated motor associated with said ware gripping members for movement therewith adapted during one of its movements to actuate the gripping members to grip and lift the ware from the open mold, and during its opposed movement to lower and release the ware, and means controlled by said reciprocable actuator for actuating said fluid pressure means.

9. In a glassware forming machine, a circular series of blow molds, a rotatable support therefor, means for automatically opening said molds, means for intermittently rotating said support including a reciprocable actuator, valve means arranged to be operated on opposite strokes of said actuator, means for removing ware from an open mold comprising ware-gripping members movably mounted adjacent the open mold for movement to ware-engaging position over said mold and ware-depositing position at a point remote therefrom, a fluid pressure operated motor associated with said ware-gripping members for movement therewith and controlled by said valve means adapted during one of its movements to actuate the gripping members to grip and lift the ware from the open mold, and during its opposed movement to lower and release the ware.

10. In a glass blowing machine, the combination with a blank mold carrier rotatably mounted to move the molds successively to separate stations including a charging station, a blow mold carrier laterally spaced from said blank mold carrier and rotatably mounted to move the molds successively to separate stations including a delivery station, blank and blow molds mounted on the carriers respectively, of means for intermittently rotating said carriers in unison, means controlled synchronously with the placing of a gather in a blank mold at the charging station for actuating said carrier rotating means, delivery mechanism including pneumatically operated ware-gripping members at the delivery station of the blow mold carrier, and means controlled by the carrier rotating means for actuating said delivery mechanism to engage the article in the blow mold, lift it therefrom and deposit it at a point remote therefrom.

11. In a glass working machine, a mold carrier having a plurality of molds thereon, means to effect movement of said molds through successive stations to a take-out station, means for forming glass articles in said molds, a conveyor, a pneumatically operated take-out mechanism adapted to remove formed ware from the mold and deposit it on the conveyor, means for locking the mold carrier to hold the molds successively in take-out position, and means controlled by the locking mechanism for effecting actuation of said take-out means.

12. In a glass working machine, a mold carrier having a plurality of molds, reciprocable fluid pressure operated means to effect intermittent movement of said molds through successive stations to a take-out station, means for forming glass articles in said molds, a conveyor, take-out mechanism adapted to remove formed ware from the mold and deposit it on said conveyor, means for locking said mold carrier to hold the molds successively in take-out position, means controlled by said locking means when in its locked position for effecting operation of said take-out means, and means for simultaneously moving said conveyor and molds.

13. In a glass working machine, a mold carrier having thereon a plurality of divided molds, fluid pressure operated means for moving said molds through successive stations to the take-out station, means for forming glass articles in said molds, means for opening said molds during movement to the take-out station, a conveyor, take-out mechanism adapted to remove formed ware from the mold and deposit it on the conveyor, means for locking said carrier to hold said molds successively at the take-out station, and means controlled by said locking means for effecting operation of the take-out means.

14. In a glassware forming machine, a rotatably mounted mold carrier having a plurality of molds thereon, fluid pressure operated means for intermittently moving said molds through successive stations including a take-out station, means for forming glass articles in said molds, a conveyor, fluid pressure operated means for intermittently moving said conveyor, a take-out mechanism for removing formed ware from the molds and depositing it on the conveyor, means for locking the mold carrier to hold the molds successively at the take-out station and means controlled by the locking means in its locked position for automatically effecting operation of the take-out means during resting periods of the molds and conveyor, and in its unlocked position for effecting simultaneous movement of the molds and conveyor.

15. In a glassware forming machine, a rotatable mold carrier having a plurality of molds mounted thereon, fluid pressure operated means for intermittently moving said molds through successive stations including a take-out station, means for forming glass articles in said molds, a conveyor, fluid pressure operated means for intermittently moving said conveyor, a take-out mechanism for removing formed ware from the molds and depositing it on the conveyor, means for locking the mold carrier to hold the molds successively at the take-out station and valve means associated with and controlled by the locking means for controlling the admission of fluid pressure to said fluid pressure operated means and take-out to effect actuation of the take-out, and subsequent simultaneous movement of the molds and conveyor.

16. In a glassware forming machine, a mold and mold opening mechanism therefor, ware-removing mechanism comprising a carriage adapted to travel toward and from the mold, vertically movable ware-engaging members on the carriage for engaging the ware following the opening movements of the mold removing ware from the mold, means controlled by the vertical movement of the ware-engaging members for controlling lateral movement of the carriage, and valve means actuated by the carriage in its travel away from the mold for applying fluid pressure to reverse the vertical movement of the ware-engaging members to release the ware held thereby.

17. In a glassware forming machine, a mold, ware-removing mechanism comprising a pneumatically operated carriage adapted to travel toward and from the mold, vertically movable ware-engaging members on the carriage for removing the ware from the mold, means controlled by the vertical movement of the ware engaging members for controlling the lateral movement of the carriage, and valve means actuated by the carriage in its travel away from the mold for applying fluid pressure to reverse the vertical movement of the ware-engaging members to release the ware held thereby.

18. In a glassware forming machine, a mold, a take-out carriage adapted to travel toward and from the mold, said carriage including a fluid pressure cylinder and a reciprocable piston therein, ware-engaging members pivotally connected to the piston, means actuated by movement of the piston for controlling lateral movement of the carriage, and valve means actuated by the travel of the carriage away from the mold for applying fluid pressure to reverse the vertical movement of the piston.

19. In a glass blowing machine, a series of blank molds, and a series of divided blow molds, means for shearing charges of glass introduced into said blank molds, ware delivery mechanism including a pneumatically operated gripping device for removing formed ware from the blow molds and means automatically operating in definite timed relation to the shearing means and initiated thereby for controlling the operation of the delivery mechanism to cause said delivery mechanism to grip and remove ware from said mold.

20. In a glassware forming machine, a rotatable carrier having a plurality of blank molds thereon, a rotatable carrier having a plurality of blow molds thereon, means for intermittently moving said mold carriers, means for shearing charges of glass introduced into said blank molds, ware-delivery mechanism including a pneumatically operated gripping device adjacent the blow mold carrier, means controlled by the carrier moving means for automatically operating the delivery mechanism at the conclusion of each carrier movement, and means set in operation by the shearing means for actuating the carrier moving means to advance the carrier periodically.

21. In a glassware forming machine, a movable mold carrier, a plurality of blow molds carried thereby, a reciprocable carrier actuator, valve means arranged to be operated by said actuator, ware delivery mechanism adjacent said blow mold carrier including a pneumatically operated ware-gripping device, and pneumatic connections between said valve means and said gripping device of said delivery means.

22. In a glassware forming machine, a movable mold carrier having a plurality of molds thereon, a reciprocable carrier actuator, valve means arranged to be operated at opposite ends of the strokes of the actuator, ware-gripping and removing mechanism adjacent said mold carrier, a conveyor adjacent said mold carrier, and means controlled by said valve means for pneumatically actuating said ware-gripping and removing mechanism and said conveyor successively to cause said gripping means to grip and laterally remove said ware from a mold and deposit it on a conveyor while the latter is at rest, and subsequently to advance said conveyor.

23. In a glassworking machine, a series of blank molds, a series of cooperating divided blow molds, means for shearing charges of glass introduced into said blank molds, means cooperating with said blank molds to initially shape a glass charge into a blank of predetermined size and form, automatic means for transferring a preformed blank from a blank mold to a blow mold, means operative thereafter for blowing the ware to final form in the blow mold, a take-out mechanism including gripping devices for gripping and lifting the ware from the mold, means to move the gripping device and ware away from the blow mold, a conveyor adapted to receive the ware delivered from the take-out device and means automatically set in operation by the shearing means for moving said conveyor.

24. In a glassworking machine, a series of blank molds, a series of cooperating divided blow molds, means for shearing charges of glass introduced into said blank molds, means cooperating with said blank molds to initially shape a glass charge into a blank of predetermined size and form, automatic means for transferring a preformed blank from a blank mold to a blow mold, means operative thereafter for blowing the ware to final form in the blow mold, a take-out mechanism including gripping devices for gripping and lifting the ware from the mold, means operating synchronously with the blank transfer means to move the gripping device upwardly and laterally away from the mold, a conveyor adapted to receive the ware delivered from the take-out device and means automatically set in operation by the shearing means for operating said conveyor.

25. In a glassware forming machine, rotatable blank and blow mold carriers laterally spaced from each other, means for rotating said carriers in unison, a series of blank molds mounted on said blank mold carrier, a series of divided blow molds on said blow mold carrier, means cooperating with said blank molds to initially form the glass charge into a blank of predetermined size and shape, automatic means for delivering a preformed blank from said blank mold and inserting it in an open blow mold, means for closing said blow mold around said blank, means adapted thereafter to cooperate with said blow mold at a position beyond where said mold receives the blank for blowing the ware to final form in the blow mold, a take-out station beyond the final blowing position, means adapted for cooperation with the blow mold after termination of the final blowing for opening the blow mold, means at the take-out station for engaging the blown ware in the open blow mold, including pneumatically operated ware-gripping and lifting devices, means to successively operate said engaging means to lift and subsequently laterally remove said blown ware from said blow mold, and means controlled by said mold carrier moving means for operating said ware-engaging means in the manner named.

26. In a glassware forming machine, rotatable blank and blow mold carriers laterally spaced from each other, a series of blank molds mounted on said blank mold carrier, a series of divided blow molds on said blow mold carrier, means cooperating with said blank molds to initially form the glass charge into a blank of predetermined size and shape, automatic means for delivering a preformed blank from said blank mold and inserting it in an open blow mold, means for closing said blow mold around said blank, means adapted to cooperate with said blow mold at a position beyond where said mold receives the blank for blowing the ware to final form in the blow mold, a take-out station beyond the final blowing position, means adapted for cooperation with successive blow molds after the termination of final blowing for opening the blow mold sections away from the article, means positioned at the take-out station for engaging the blown ware in the open blow mold including pneumatically operated ware-gripping and lifting devices, a conveyor member adjacent said blow mold carrier at the take-out station, means to successively operate said engaging means to lift and subsequently laterally remove said blown ware from said blow mold, deposit it upon the conveyor and then move the conveyor, and means controlled by the mold carrier moving means for operating said ware-engaging means and conveyor in the order named.

JAMES W. LYNCH.
EDWARD G. BRIDGES.